(12) United States Patent
Austin et al.

(10) Patent No.: US 8,402,527 B2
(45) Date of Patent: Mar. 19, 2013

(54) IDENTITY BROKER CONFIGURED TO AUTHENTICATE USERS TO HOST SERVICES

(75) Inventors: Kyle Dean Austin, Saratoga, CA (US); Brett Jason Schoppert, Leesburg, VA (US); Michael Almond, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 307 days.

(21) Appl. No.: 12/817,960

(22) Filed: Jun. 17, 2010

(65) Prior Publication Data

US 2011/0314533 A1     Dec. 22, 2011

(51) Int. Cl.
*G06F 7/04*     (2006.01)
*G06F 15/16*    (2006.01)
*G06F 17/30*    (2006.01)
*H04L 29/06*    (2006.01)

(52) U.S. Cl. .......................................................... 726/9
(58) Field of Classification Search ..................... 726/9
See application file for complete search history.

(56) References Cited

U.S. PATENT DOCUMENTS

2008/0046984 A1* 2/2008 Bohmer et al. ................. 726/5

* cited by examiner

*Primary Examiner* — Kambiz Zand
*Assistant Examiner* — Stephen Sanders

(57) ABSTRACT

Techniques are disclosed for an identity broker to authenticate users to a network device, system, or hosted application that uses certain legacy protocols for user authentication. For example, the identity broker may be configured to respond to a user authentication request from a network device formatted as a RADIUS or LDAP message. The identity broker may operate in conjunction with an identity provider to authenticate a user requesting access to a computing resource (e.g., to the network device, system, or hosted application).

25 Claims, 7 Drawing Sheets

IDENTITY BROKER CONFIGURED TO AUTHENTICATE USERS TO HOST SERVICES

BACKGROUND OF THE INVENTION

1. Field of the Invention

Embodiments of the invention generally relate to enhancing the security of authentication and authorization processes used by certain network devices and hosted applications, and more particularly to an identity broker configured to authenticate users to servers that use certain legacy protocols.

2. Description of the Related Art

User authentication and authorization has been (and remains) a central concern for computer security. Authentication generally refers to a process of verifying the identity of a user (or entity) requesting access to a computing resource. And authorization generally refers to a process of determining the access rights, roles, group membership, etc., of an authenticated user.

While some network devices and networked applications manage user authentication and authorizations directly, a large number of existing systems authenticate users by communicating with an external server according to a user-authentication protocol. For example, many network devices may be configured to communicate with an external server to authenticate a set of credentials submitted by a given user prior to granting access to a computing resource (e.g., a VPN device allowing secure access to a private network). Two well-known user-authentication protocols include RADIUS and LDAP.

RADIUS, short for Remote Authentication Dial In User Service, is a networking protocol that allows users to connect to and use a network service. RADIUS operates as a client/server protocol, originally developed to authenticate users connecting to network services over telephone modems. A RADIUS server authenticates a user requesting access to a network device or hosted application by validating for a username and password submitted to the device requesting an authentication decision. That is, a RADIUS server responds to an authentication request with essentially a true/false message regarding the submitted credentials, such as a given username/password combination. Additionally, a RADIUS server can share certain accounting data with a network device or application (e.g., how much time a user has been (or is authorized to be) connected to a computing resource).

LDAP, short for Lightweight Directory Access Protocol, is a well-known protocol used to manage information about authorized users on a network such as names, phone numbers, and addresses. LDAP, like RADIUS, specifies a protocol for authenticating a user using a username/password combination. An LDAP server can also return a collection of attributes and/or security policies associated with an authenticated user (e.g., a list of groups which a user is a member).

SUMMARY OF THE INVENTION

Embodiments of the invention provide techniques for authenticating users to a network device, system, or hosted application that uses certain (e.g., legacy) protocols for user authentication. One embodiment of the invention includes a computer-implemented method for authenticating a user requesting access to a computing resource. The method may generally include receiving, from the computing resource, a request to authenticate the user. The request itself may include a token and a username and may be formatted according to a user authentication protocol understood by the computing resource. The method may also include invoking, on an identity provider server, a token validation process. The token is passed as a parameter to the token validation process. The method may also include receiving, from the identity provider server, an authentication message and generating, in response to the request received from the computing resource, a validation response formatted according to the user authentication protocol. The response indicates whether the authentication message indicates the token was successfully validated by the identity provider server.

In a particular embodiment, the authentication message further includes an indication of one or more attributes associated with the user requesting access to the computing resources stored on the identity provider server. The user authentication protocol may be the Remote Authentication Dial In User Service (RADIUS) protocol or the lightweight directory access protocol (LDAP).

Another embodiment includes a computer-readable storage medium containing a program which, when executed by a processor, performs an operation for authenticating a user requesting access to a computing resource. The operation may include receiving, from the computing resource, a request to authenticate the user. The request itself may include a token and a username and be formatted according to a user authentication protocol understood by the computing resource. The operation may also include invoking, on an identity provider server, a token validation process. The token is passed as a parameter to the token validation process. The operation may also include receiving, from the identity provider server, an authentication message and generating, in response to the request received from the computing resource, a validation response formatted according to the user authentication protocol. The response indicates whether the authentication message indicates the token was successfully validated by the identity provider server.

Still another embodiment of the invention includes a system having one or more computer processors and a memory containing a program, which when executed by the one or more computer processors is configured to perform an operation for authenticating a user requesting access to a computing resource. The operation may include receiving, from the computing resource, a request to authenticate the user. The request itself may include a token and a username and may be formatted according to a user authentication protocol understood by the computing resource. The operation may also include invoking, on an identity provider server, a token validation process. The token is passed as a parameter to the token validation process. The operation may also include receiving, from the identity provider server, an authentication message and generating, in response to the request received from the computing resource, a validation response formatted according to the user authentication protocol. The response may indicate whether the authentication message indicates the token was successfully validated by the identity provider server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
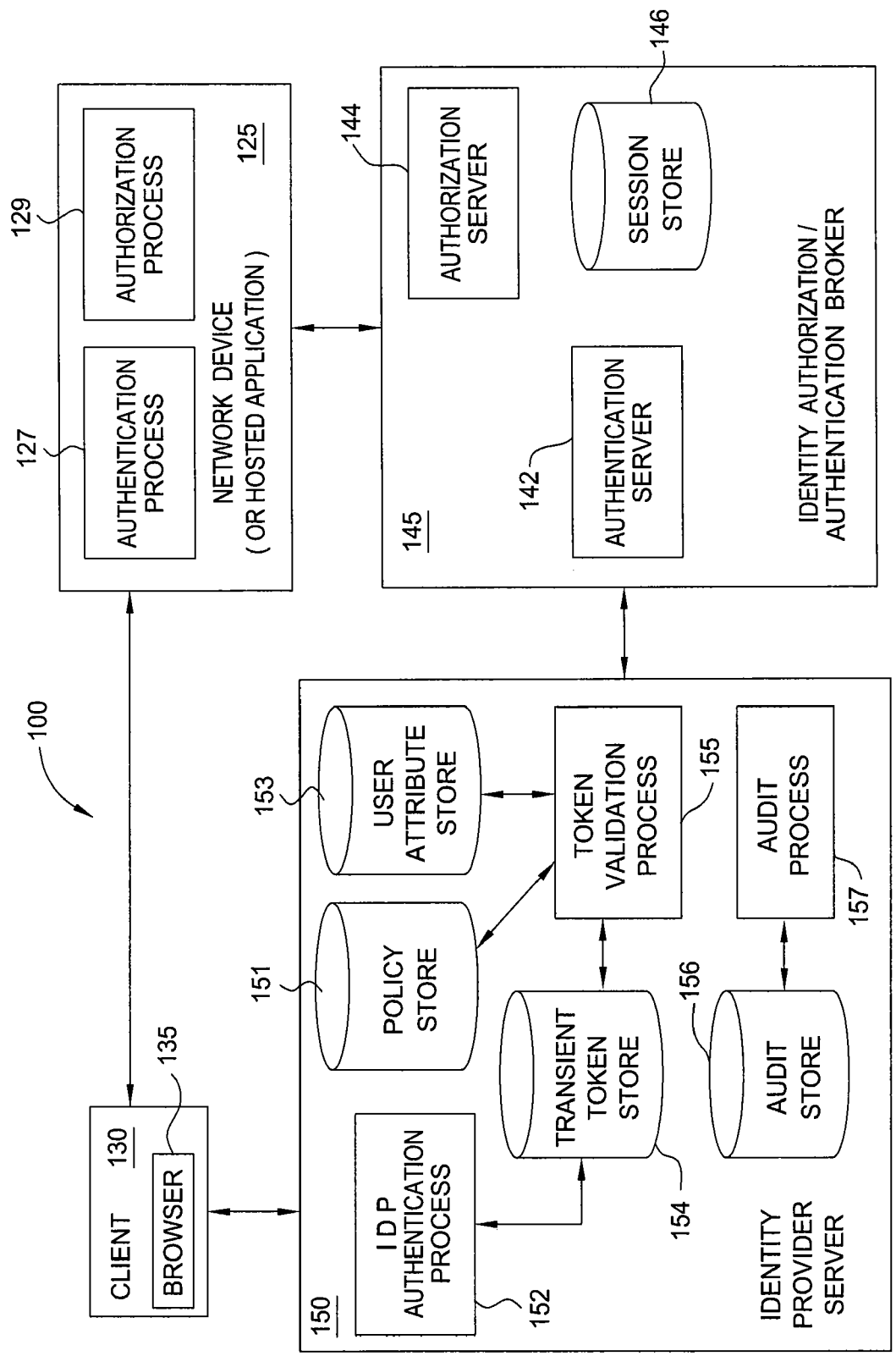
FIG. 1 illustrates an identity broker communicating with a host application (or network device) and an identity provider server, according to one embodiment of the invention.

Embodiments of the invention provide techniques for an identity broker to authenticate users to network devices (or hosted applications) that use certain (e.g., legacy) protocols for user authentication. For example, the identity broker may be configured to respond to a user-authentication request from a network device formatted as a RADIUS or LDAP message. The identity broker may operate in conjunction with an identity provider to authenticate a user requesting access to a computing resource (e.g., the network device or hosted application).

In one embodiment, the authentication process may be user-initiated, where the user authenticates their identity with the identity provider and then requests access to a computing resource. In such a case, once authenticated, the user can access any network device or hosted application configured to rely on user-identity assertions made by the identity provider. That is, the authentication with the identity provider can act as a single-sign on point, allowing the user to access a variety of systems without having to be re-authenticated. Alternatively, a network device (or hosted application) may initiate the authentication process with the identity provider in response to the user requesting access to the network device.

In either case, the authentication process between the user and the identity provider may be weak (e.g., based on user name and password alone) or strong (e.g., based on cryptographic or biometric protocols). Once the authentication process between the identity provider and the user is complete, the identity provider may supply credentials used to access a network device (or hosted application). The credentials may include a single-use token generated by the identity provider. The token itself may be generated as a random or pseudo-random alpha numeric string. The token may also include a time-to-live parameter. In one embodiment, the token generation and passing process may be generally transparent to the user. For example, a browser on the client may be configured to automatically pass a username along with the token (as a password) to a network device. The network device may be configured to authenticate users according to a host authentication protocol (e.g., by communicating with an LDAP or RADIUS server). In turn, the network device passes the username and token to the identity broker, which validates the single-use token with the identity provider. Once validated, the identity broker passes a response back to the network device (or hosted application) also formatted as a RADIUS or LDAP message (depending on the configuration of the network device). That is, the identity broker masquerades as the appropriate server for a given network device, while at the same time, relies on the authentication processes performed by the identity provider (by validating the token). Further, the identity provider may also pass a variety of user attributes or metadata back to the identity broker. Doing so may allow the broker to respond to other requests from the network device formatted according to the host authentication protocol (i.e., additional RADIUS or LDAP messages).

Thus, the identity broker allows existing systems using certain legacy authentication protocols (e.g., RADIUS and LDAP) to take advantage of the federated authentication processes performed between the identity provider and the user, without also having to modify such existing systems. Further, this approach fits into the more secure identity federation models currently in use, allowing these systems to be more secure, particularly when such systems are accessed over untrusted networks (e.g., an application hosted on a virtual machine instance running on hardware provided by a cloud service provider).

More generally, embodiments of the invention may be provided to end users through a cloud computing infrastructure (where a user access an application program hosted "in the cloud"). Cloud computing generally refers to the provision of scalable computing resources as a service over a network. More formally, NIST has defined cloud computing as "a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction." Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may authenticate themselves to applications hosted in the cloud, where the hosted application is configured to authenticate users by communicating with an authentication server using a legacy host protocol (e.g., a RADIUS or LDAP server). Further, the identity server system and identity broker discussed below may be applications hosted in "the cloud" as well.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

FIG. 1 illustrates a computing infrastructure 100 in which an identity broker communicates with both a network device (or host application) and an identity provider server in order to authenticate a client requesting access to the network device, according to one embodiment of the invention. As shown, the computing infrastructure 100 includes a network device 125, an identity provider server 150, an identity authentication/authorization broker 145, and a client system 130.

In one embodiment, the client system 130 communicates over a public network (e.g., the Internet) with an identity provider authentication process 152 hosted by the identity provider (IdP) server 150. For example, a user may access a webpage provided by the IdP server 150 using browser 135. Such a webpage may include a list of network devices and/or networked applications to which the IdP server 150 may authenticate the user. The user may initiate the authentication process by selecting to access one of the listed network devices (e.g., network device 125) or hosted applications.

Once selected, the IdP process 152 may prompt the user for a set of authentication credentials. The authentication credentials may be a simple username/password combination, but can also be based on more sophisticated (and typically more secure) authentication schemes. For example, a private key stored on a smartcard may cryptographically sign a message sent to the IdP process 152 from the client 130. Once sent, the IdP process 152 may verify the message using an associated public key named in a PKI certificate. Another authentication scheme could be based on a biometric identifier supplied by the user. Of course, other authentication schemes or protocols could be used as well. Additionally, in one embodiment, the messages exchanged between the client 130 and the IdP server 150 may be formatted using the Security Assertion Markup Language (SAML).

Regardless of the particular authentication mechanism, once the IdP server 150 successfully authenticates the user, the IdP process 152 generates a token which is then stored in a transient token store 154. In one embodiment, the token is a random (or pseudo-random) alpha-numeric string generated by the IdP process 152. In addition to being stored in the transient token store 154, the token is passed back to the browser 135 on the client 130. In turn, the browser 135 passes a username and the token (as a password) to an authentication process 127 on the network device 125. This process may be generally transparent to the user. For example, the webpage provided by IdP server 150 may include the appropriate logic to receive the token and redirect it to the network device 125. Alternatively, a plug-in on the browser 135 could detect the presence of a username and password dialog and automatically populate the contents of such a dialog with the token value. As another alternative, a user could simply copy and paste the token value into a password prompt. In addition, the IdP server 150 may create a session for the authenticated user, allowing the user to access other systems without needing to be re-authenticated.

The network device 125 is intended to be representative of a variety of network systems, servers, or applications configured to authenticate users according to a user-authentication protocol such as RADIUS or LDAP. For example, the network device 125 may be a VPN device used as an entry point for a private network. Alternatively, the network device could be a computing system accessed using a shell program such as telnet or SSH (or other remote access mechanism). In such a case, a pluggable authentication module (PAM) on the computing system may communicate with a RADIUS or LDAP server to authenticate credentials submitted by the user (i.e., the username and the token). Similarly, the network device 125 may be a computer system hosting a web-based or otherwise networked application that is configured to authenticate users by communicating with an LDAP or RADIUS server to validate a username/password combination. As noted, the application itself may be hosted on a cloud-based server.

As shown, the network device 125 includes an authentication process 127 and authorization process 129. In one embodiment, the authentication process 127 is configured to receive the username and token from the browser 135. In response, the authentication process 127 uses the username and token to authenticate the client 130 with the identity broker 145. For example, the authentication process 127 may pass the username and token (as a password) to the identity broker 145 in a message formatted according to a user authentication protocol, e.g., as a RADIUS or LDAP message. In response, the authentication process 127 receives a yes/no or true/false message indicating whether the username and token are valid. If valid, the network device 125 grants the client 130 access to the requested computing resource.

In one embodiment, an authentication server 142 validates the user on behalf of the network device 125 by invoking a token validation process 155 on the IdP provider server 150. For example, the token validation process 155 may be a web-service published by the IdP server 150. In such a case, the authentication server 142 generates a message (e.g., a SOAP message) to pass the token and an identifier for the network device 125 (e.g., an IP address) as message parameters in a command to invoke the validation process 155. Of course, protocols other than SOAP may be used.

The token validation process 155 may be configured to determine whether the token matches one in the transient token store 154. Further, the token may include an indication of an intended recipient (i.e., an indication of the network device 125). In one embodiment, the indication may simply be the IP address of the network device 125. Of course, other approaches may be used. The validation process 155 may determine whether the recipient identifier matches the network device 125 selected by a user (or that initiated the authentication process with the IdP server 150). That is, the recipient identifier allows the identity broker 145 to verify that the network device 125 is the device that should be in possession of the token. Doing so prevents another device obtaining the token and attempting to use it and prevents the user from attempting to use the token to authenticate to a different device. In other words, it makes sure that the token is being used to authenticate the user to the device it was originally issued for. Of course, other techniques could be used to verify that the device to which a token was issued is also the device requesting it be validated. Additionally, the token validation process may verify that the token has not exceeded a validity period indicated by a time-to-live value associated with the token.

If the token matches, then the token validation process 155 may invalidate that token value in the transient token store 154 (to prevent replay attacks), and return a message to the authentication server 142 indicating that the user has been authenticated. In turn, the authorization server 142 passes a message back to the network device 125 formatted according to the user-authentication protocol used by the network device 125 (e.g., RADIUS or LDAP), and the network device 125 may then grant access to the computing resource as requested by the client 130. For example, assume the network device 125 is a VPN access point. In such a case, once the client is authenticated, the network device 125 may assign an IP address, establish a secure tunnel connection between the client and the network device 125 (e.g., an IPsec tunnel) and begin routing network traffic from the client 130 as part of a private network behind the VPN.

In addition to validating the token, the token validation process 155 may pass the username associated with the token back to the authentication server 142 along with any attributes/polices associated with user stored in user attribute store 153 and/or in policy store 151. The authentication server 142 may store this information in a session store 146. The authorization server 144 may access the session store 146 to respond to authorization requests from the authorization process 129 on the network device 125. For example, assume the network device 125 is a file server and that the identity broker 145 has authenticated a user through messages formatted according to the LDAP protocol. In such a case, a hierarchy of folders (and files in the folders) on the network device 125 may have user/group access rights. The authorization process 129 may request a list of groups to which a given user belongs in an LDAP formatted message. And, in turn, the authorization server 144 retrieves this information from the session store 146 and returns a group membership list in an LDAP formatted message to the authorization process 129 on the network device 125. Similarly, any access policies associated with a given user may be retrieved from the session store 146 by the authorization server 144 and returned to the authorization process 129.

Further, the audit process 157 on the IdP server 150 may store a record of certain user actions. For example, assume the network device 125 is configured to use RADUIS as the user authentication protocol. In such case, the user may have account usage limits specified according to the RADIUS protocol. In such a case, the authorization server 144 may obtain account usage data from the network device 125 and pass it to the audit process 157 to be stored in the audit store 156. More generally, the audit process 157 may create the appropriate records of any activity performed by the authentication server 142 or authorization server 144 for which an audit trial is desired.

Figure 2:
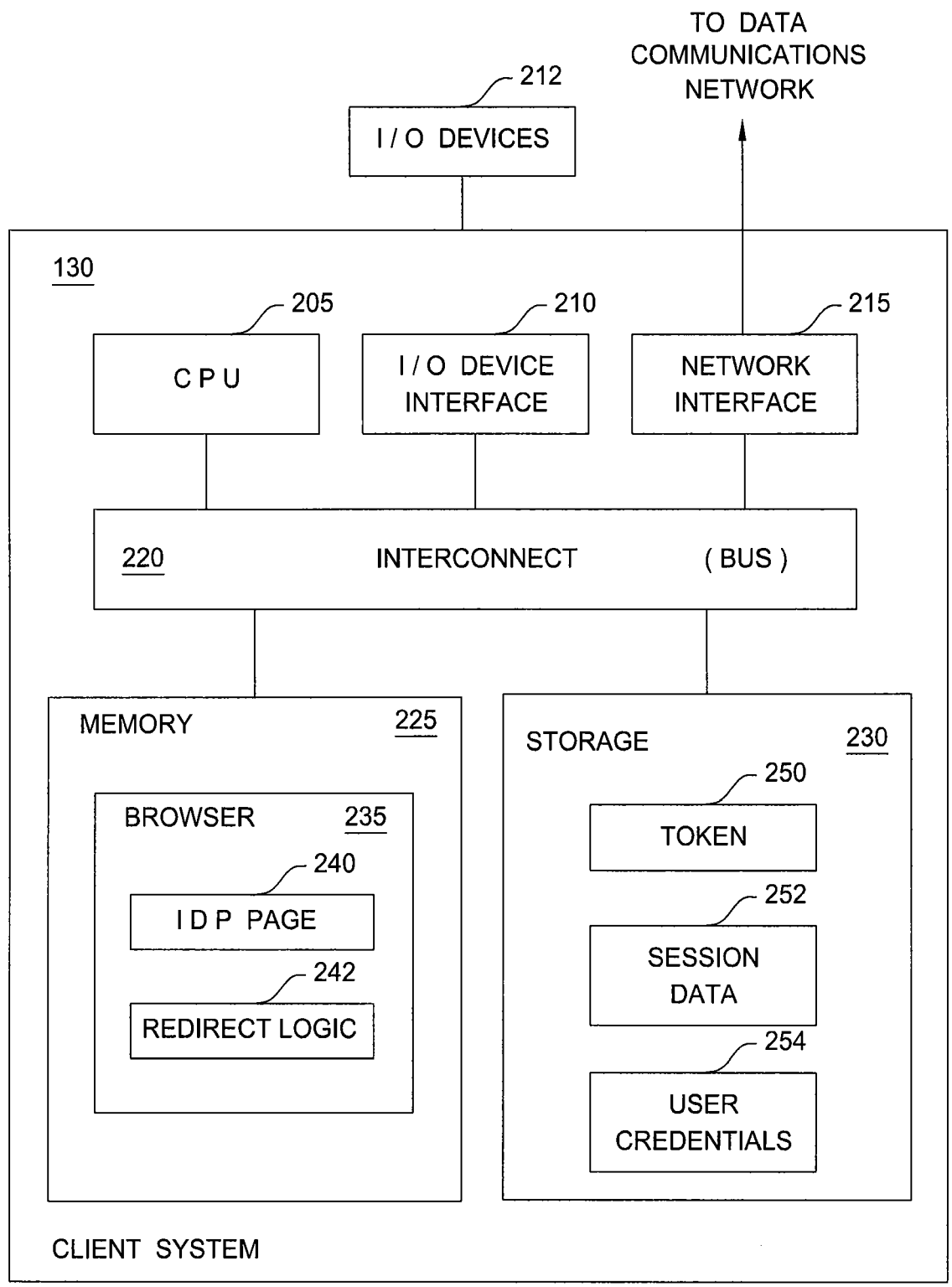
FIG. 2 is a more detailed view of a client computing system of FIG. 1, according to one embodiment of the invention.

FIG. 2 is a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The computing system 130 may also include an I/O devices interface 210 connecting I/O devices 212 to the computing system 130 (e.g., keyboard, display and mouse devices).

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 includes a web browser application 235, which itself includes an identity provider (IdP) webpage 240 and redirect logic 242. Storage 230 includes a token 250, session data 252, and user credentials 254. The browser 235 provides a software application that allows a user to access a web application hosted on a server (e.g., the IdP authentication process 152 on the IdP server 150). The page 240 corresponds to the content obtained from the IdP server 150 and rendered by the browser 235. In one embodiment, the page 240 may include a list of network devices, systems, or applications that a user may be authenticated to using the IdP server 150. Additionally, the page 240 may include the appropriate logic to prompt for user credentials 254 used by the IdP server 150 to authenticate the user when requesting access to one of the devices, systems, or applications listed on page 240. As noted above, the user credentials 254 may be the appropriate cryptographic or biometric data used in a strong authentication process between the client 130 and the IdP server 150. Additionally, although shown in storage 230, user credentials 254 may be stored on a smart card, flash memory, USB or PCMCIA device, etc. User credentials 254 may also be a password known to the user (in such a case, the password need not be present in storage 230). As discussed above, once authenticated, the IdP server may generate a token 250 and pass it to the client 130. Once received, redirect logic 242 may redirect the token 250 received from the IdP server 150 to a network device or hosted application to which the user has requested access (along with a username).

As shown, storage 230 also includes session data 252. In one embodiment, once the IdP server 150 has authenticated a user, the session data 252 allows the user to continue to use that prior authentication to access additional network devices, systems, or applications. In such a case, when the user requests access to another system, the IdP server generates a new token passed to the client 130 and to the second network device, system, or application, without also requiring that the user be re-authenticated.

Figure 3:
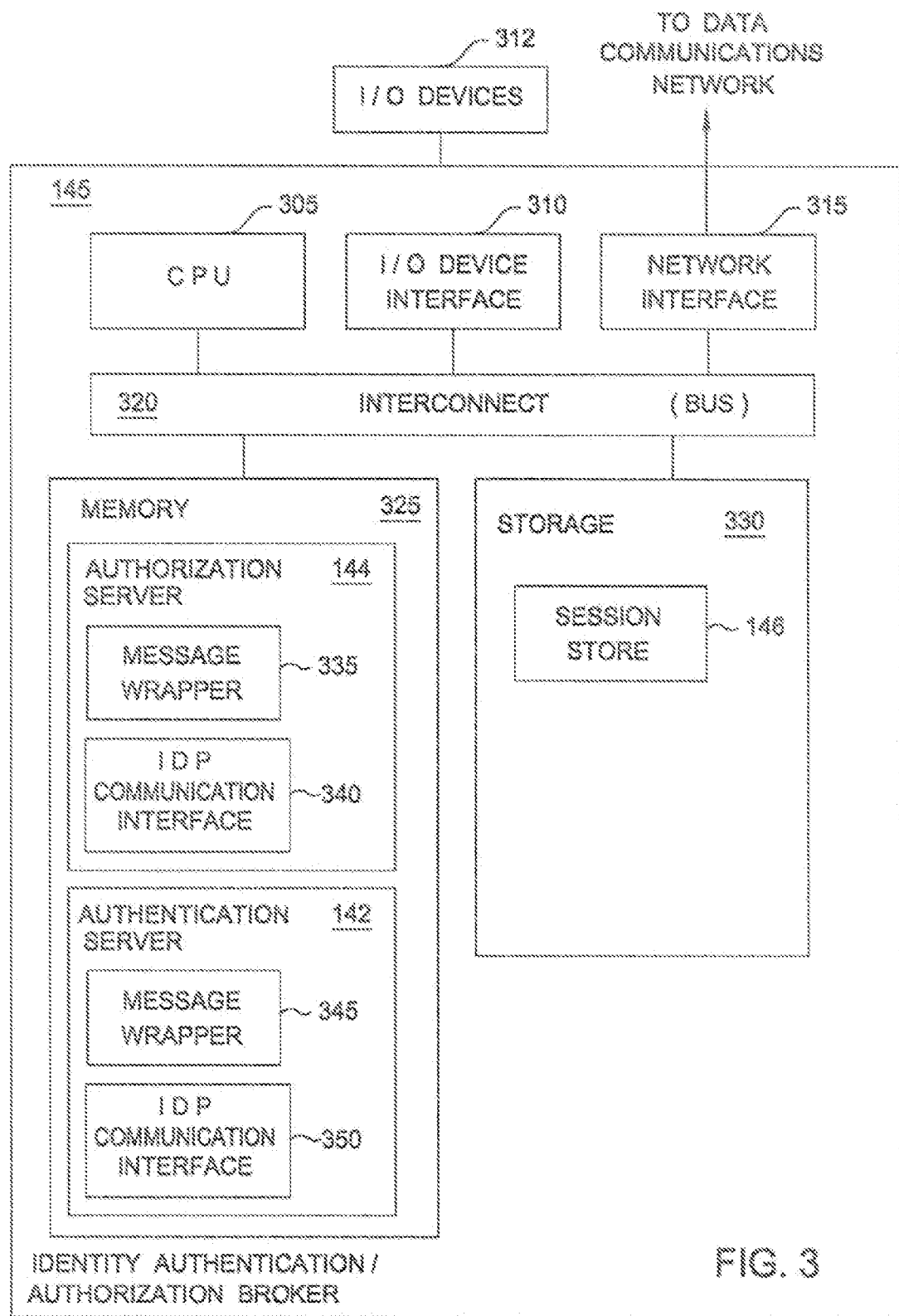
FIG. 3 is a more detailed view of the identity broker of FIG. 1, according to one embodiment of the invention.

FIG. 3 is a more detailed view of the identity broker 145 of FIG. 1, according to one embodiment of the invention. As shown, the identity broker 145 is a computing system which includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 150.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices inter-face 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network. Although shown as a single unit, the storage 330 may be a combination of fixed and/or removable storage devices, such as fixed disk drives, tape drives, removable memory cards, optical storage, net-work attached storage (NAS), or a storage area-network (SAN).

Illustratively, the memory 325 includes the authorization server 144 and the authentication server 142 of FIG. 1, and the storage 330 includes the session store 146. As described above, the authentication server 142 is configured to authenticate a user on behalf of a network device, (or hosted application) using a token passed from an identity provider 150 to a client system 130, from the client system 130 to the network device 125, and finally from the network device 125 to the identity broker 145. The token itself may be passed to the authentication server 142 as part of a username and password combination formatted according to a host authentication protocol used by the particular network device, system or application (e.g., as RADIUS or LDAP messages). Once received, an identity provider communication interface 340 may invoke a web service available on the client to validate the token received from the network device with the IdP server 150. Assuming the token is valid, the IdP server 150 may respond by sending a message indicating the validity of the token, a username, and any attributes or polices associated with the user stored by the IdP server 150. The authentication server 142 may store any received attributes or policies in the session store 146. Additionally, a message wrapper 335 may generate a message indicating the successful authentication of the token formatted using the host authentication protocol. For example, the message wrapper 335 may generate a RADIUS or LDAP message, as appropriate for the particular network device, system or application requesting authentication of the username and token (supplied as a password).

As noted above, the authorization server 142 may be configured to receive and respond to additional messages from the network device, system, or hosted application formatted using the host authentication protocol, e.g., as additional RADIUS or LDAP messages. For example, the message wrapper 345 may generate RADIUS messages describing account usage data for a given user or generate LDAP messages describing the group membership (or other attributes) of the user. Further, an IdP communications interface 350 may be configured to send audit data to the IdP server 150.

Figure 4:
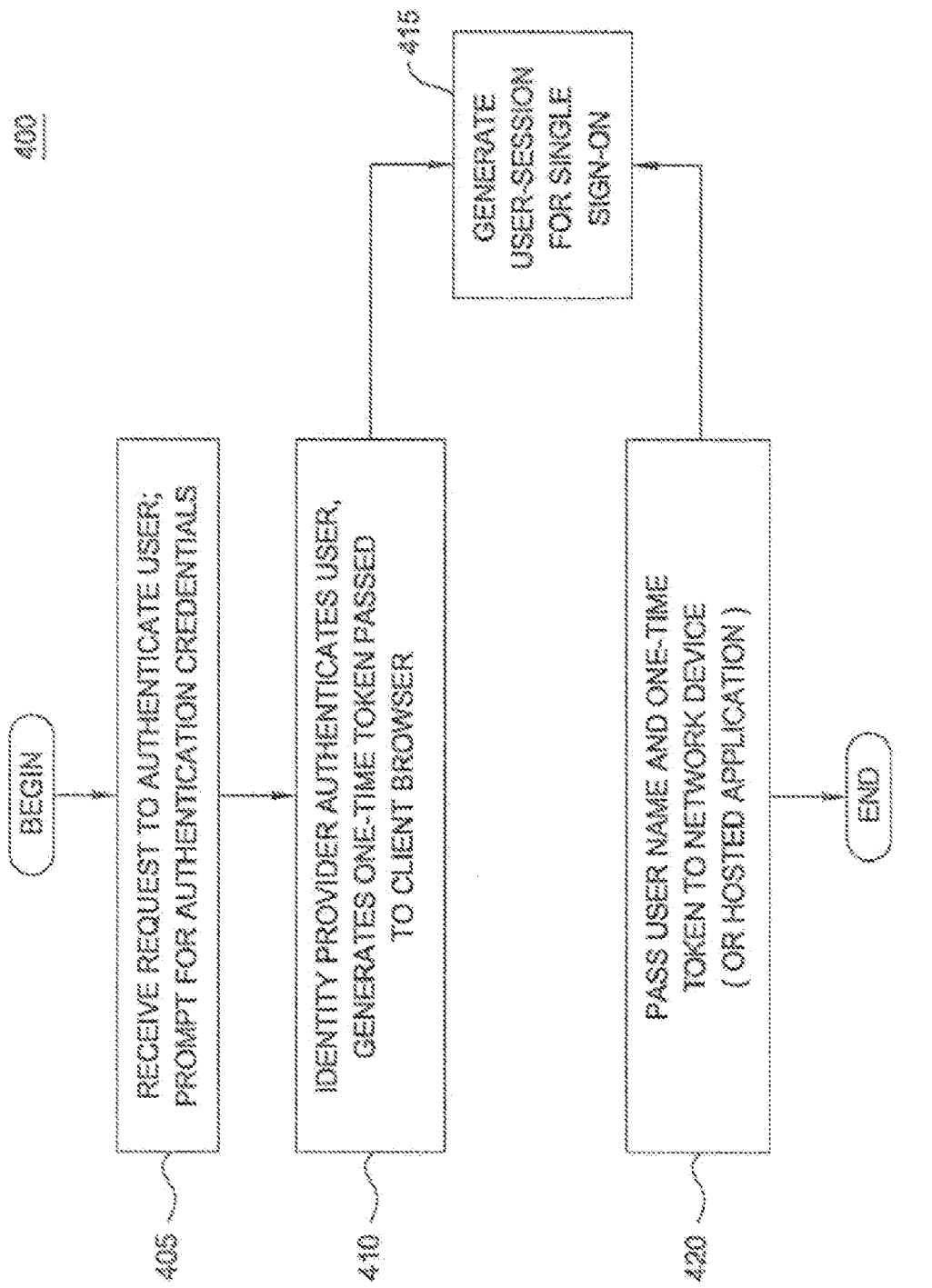
FIG. 4 illustrates a method for a user to supply authentication credentials to an identity provider in order to obtain access to a computing resource, according to one embodiment of the invention.

FIG. 4 illustrates a method 400 for a user to supply authentication credentials to an identity provider in order to obtain access to a computing resource, according to one embodiment of the invention. As shown, the method 400 begins at step 405, where the IdP provider 150 receives a request to authenticate a user. In response, the user is prompted to supply the particular authentication credentials used by the IdP server. As noted above, the request may be the result of a user-initiated identity authentication request, where the user interacts with the identity provider to select to access an available network device, system, or hosted application.

At step 410, the IdP server authenticates the user based on the user's authentication credentials and generates a single-use token returned to the client. At step 415, the IdP server may create a user-session for single-sign on purposes. That is, the IdP server may generate a session to represent the fact that the IdP server has authenticated a given user. Doing so allows the user to access additional network devices for a certain period of time (or according to other conditions) without having to be re-authenticated. The session may also identify the particular network device, system, or hosted application selected by the user as being the recipient of the token. That is, as the token is generated to allow the user to access a particular computing resource, the session may associate the token with this computing resource in order to help prevent replay attacks.

At step 420, the client passes the username/token combination to the network device the user has selected to access. As discussed above, this may be transparent to the user, where the token is passed by the IdP server to a browser configured to pass the token (as a password) along with a username to the selected client device. Alternatively, a browser plug-in may populate a password dialog with the token value or the user may simply copy and paste the token value into a password prompt. Once received, the network device, system, or hosted application authenticates the username and token (as a password).

Figure 5:
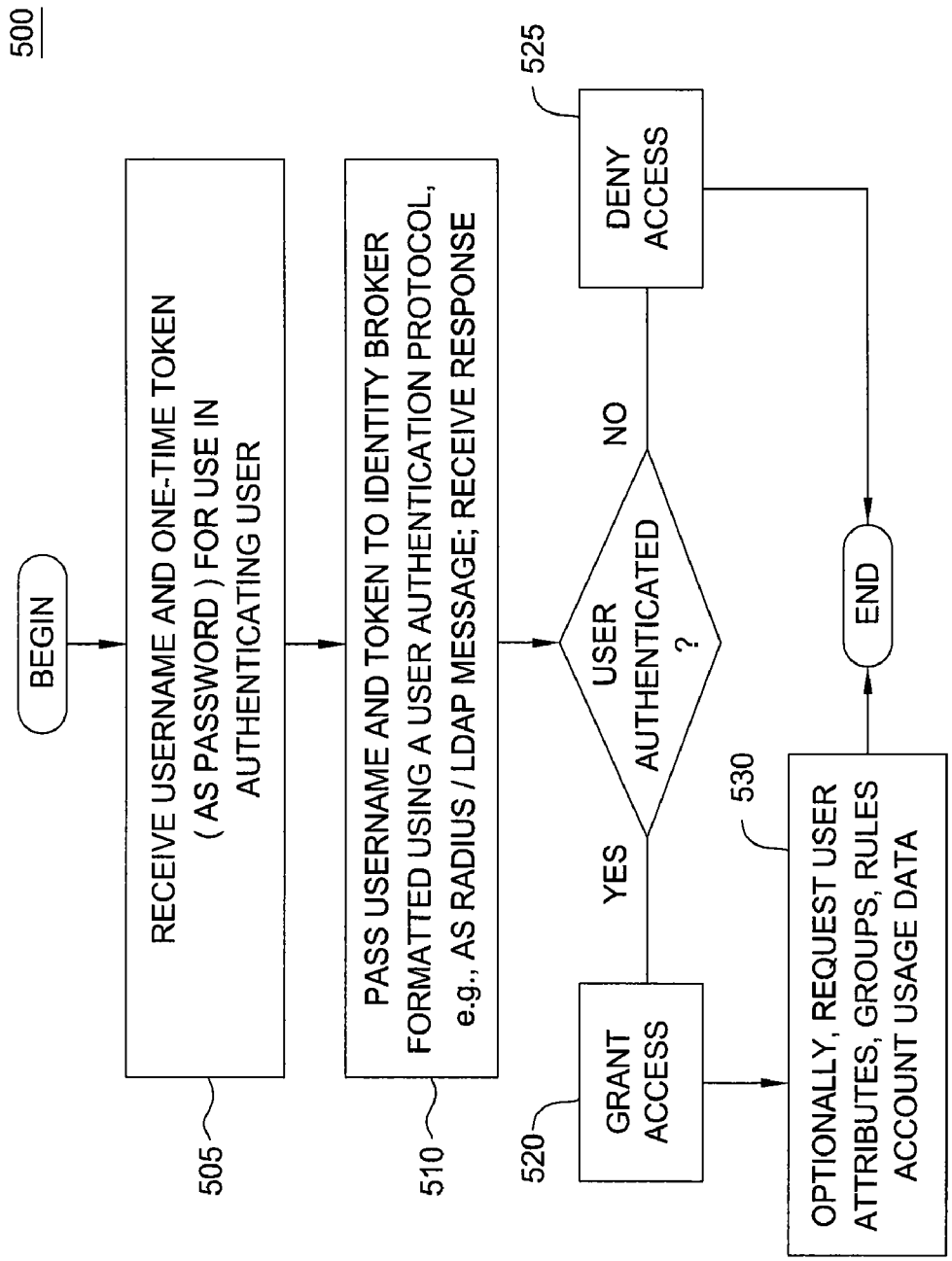
FIG. 5 illustrates a method for a network device (or hosted application) to authenticate a user by communicating with an identity broker, according to one embodiment of the invention.

FIG. 5 illustrates a method 500 for a network device, system, or hosted application to authenticate a user by communicating with an identity broker, according to one embodiment of the invention. Method 500 illustrates the authentication process generally from the perspective of a network device, system, or hosted application. As shown, the method 500 begins at step 505 where the network device, system or hosted application receives a username and single-use token (as a password) to use in authenticating a user requesting access. At step 510, the received username and token combination is passed to the identity broker in a message formatted according to a user authentication protocol, such as a RADIUS or LDAP message. A response is then received form the identity broker, also formatted according to the user-authentication protocol.

At step 525, if the response indicates that the user has not been authenticated, then the network device, system, or hosted application denies access to the user. Otherwise, if the response indicates the user has been successfully authenticated, access to the requested computing resource is granted to the user (step 520). At step 530, the network device, system, or hosted application may also request user attributes, group memberships, authorized user roles, or account usage data, and the like, from the identity provider using messages formatted according to the user authentication protocol.

Figure 6:
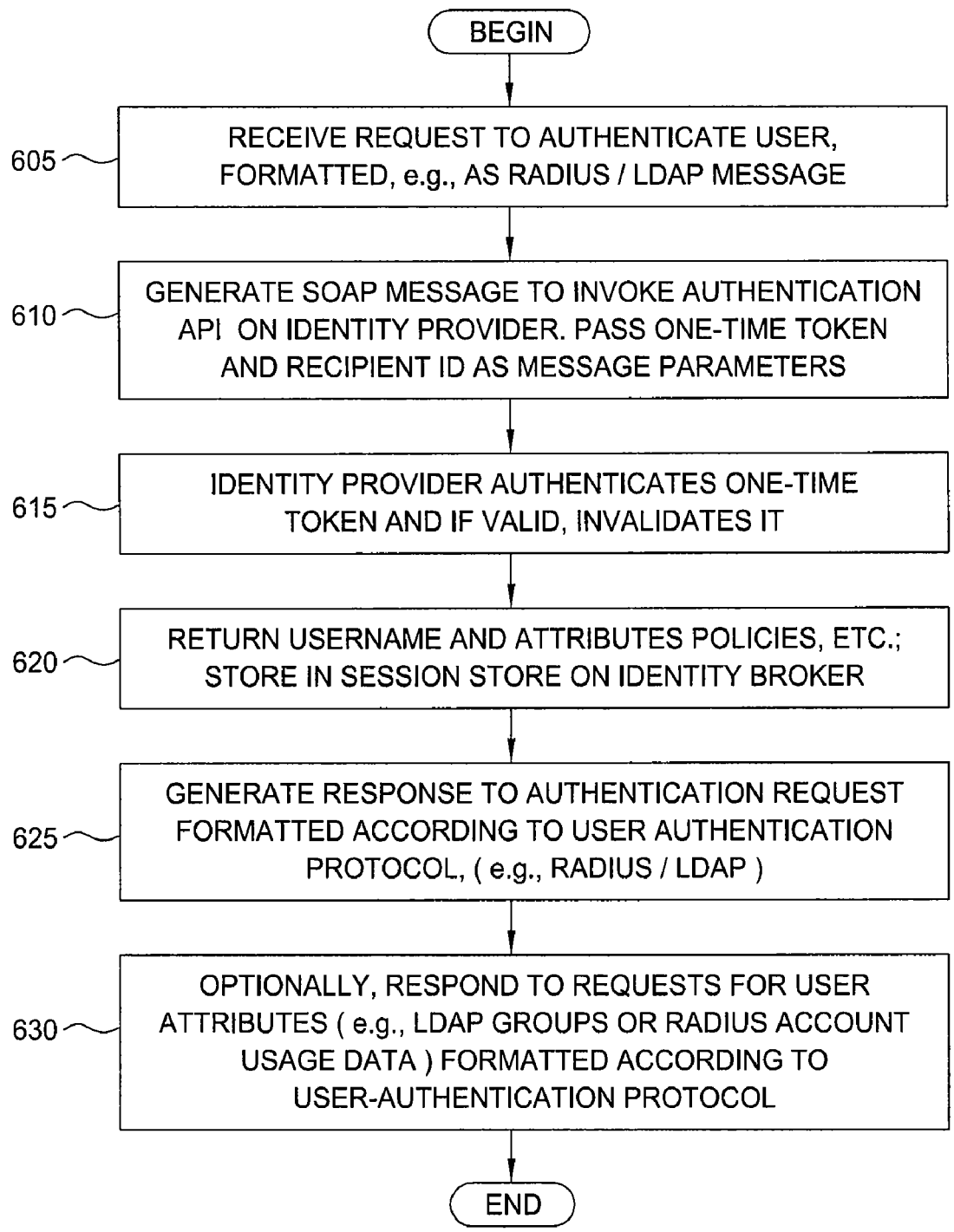
FIG. 6 illustrates a method for an identity broker to respond to an authentication request from a network device formatted using a user authentication protocol, according to one embodiment of the invention.

FIG. 6 illustrates a method for an identity broker to respond to an authentication request from a network device formatted using a user-authentication protocol, according to one embodiment of the invention. As shown, the method 600 begins at step 605, where the identity broker receives a request to authenticate a user, the request being formatted according to the user authentication protocol (e.g., as a RADIUS or LDAP message). As described above, the request may include the username and token received by the network device from the client requesting access.

At step 610, the identity broker generates a message (e.g., a SOAP message) to invoke a token validation process available from an identity provider (IdP) server. The message may include the single-use token received form the network device (and originally generated by the IdP server) along with a recipient ID associated with the network device, system, or hosted application, e.g., an IP address. At step 615, the IdP server authenticates the single-use token, and if valid, invalidates it to prevent replay attacks. Assuming the token is valid and the recipient ID matches the same information stored on the IdP server when, the IdP server then returns a username associated with the token along with any attributes or policies associated with the user (step 620). In response, the identity broker stores this information in a session store.

At step 625, the identity broker generates a response to the authentication request received at step 605. The response may be formatted according to the user authentication protocol understood by the network device, system, or hosted application, i.e., as a RADIUS or LDAP message. At step 630, the identity broker responds to any additional messages from the network device, system, or hosted application. As noted above, e.g., the identity broker may respond to a request for user account data by generating RADIUS messages describing account usage data for a given user or respond to a request for user group membership data by generating LDAP messages describing the group membership (or other attributes) of the user. Of course, one of ordinary skill in the art will recognize that the identity broker may be configured to receive and respond to a variety of messages formatted according to the user authentication protocol understood by the network device, system or hosted application.

Figure 7:
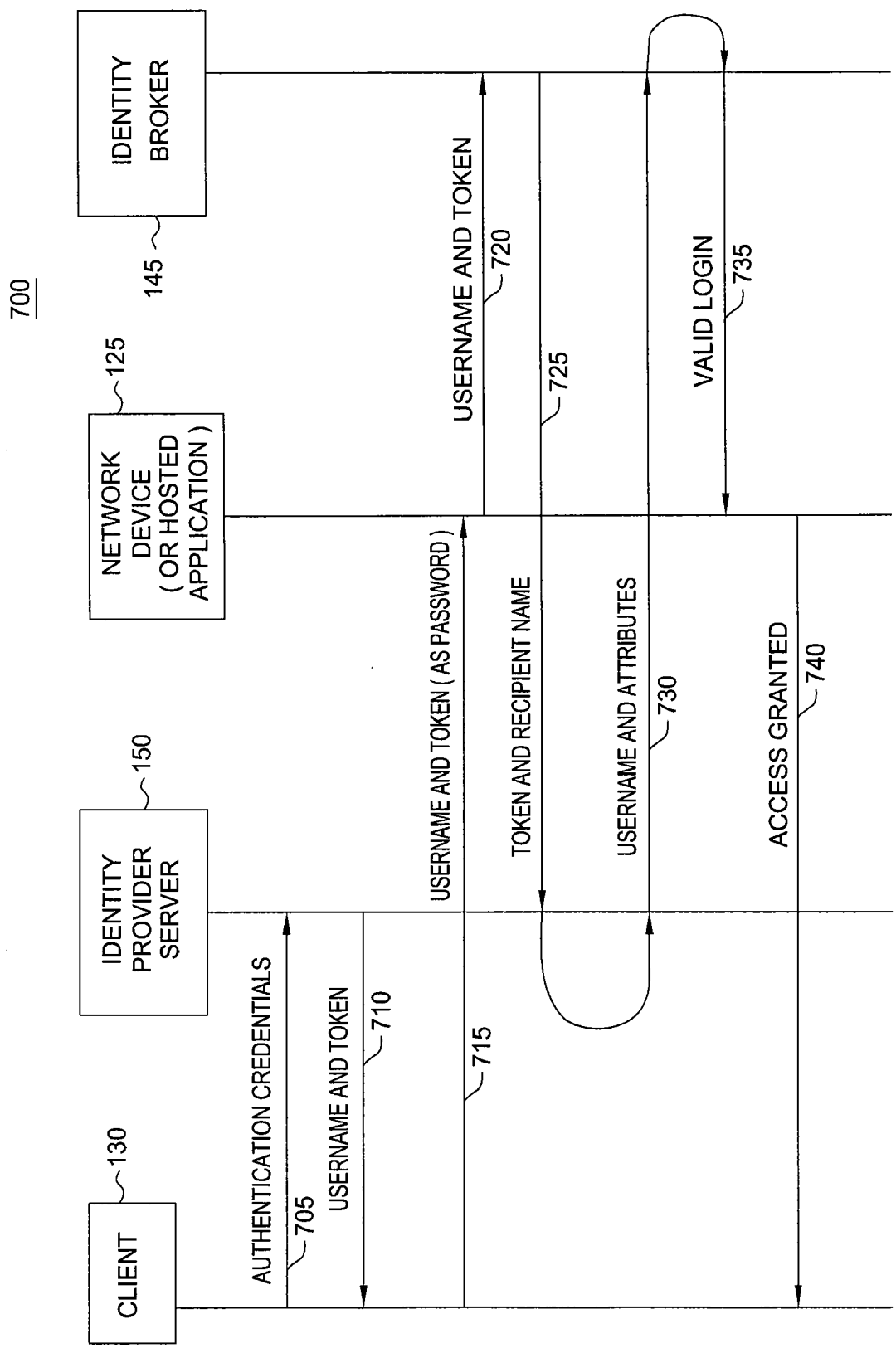
FIG. 7 is a timing sequence diagram further illustrating the methods of FIGS. 4, 5, and 6.

FIG. 7 is a timing sequence diagram 700 illustrating the methods of FIGS. 4, 5, and 6 and the interaction among the client 130, identity provider (IdP) server 150, the network device 125 (or hosted application), and the identity broker 145, according to one embodiment of the invention. At 705, the client 130 passes the authentication credentials to the IdP server 150. In one embodiment, the message is passed to the IdP server as a SAML message. At 710, once the authentication process is complete, the IdP server 150 passes a username and token back to the client. Note, the username passed to the client by the IdP server 150 does not have to be the same username that authenticated with the IdP. That is, a mapped user name may be used to allow the username passed back by the IdP server 150 to be different from the username used for the initial authentication. For example, assume Bill, Bob and Jane could all share the username "Joe" on the network device 125. In such a case, the IdP server 150 authenticates user "Bill" and tells the client device they are user "Joe" (as a username) and provides the token (as a password). In one embodiment, the response sent at 710 is passed as a SAML security assertion.

At 715, the client 130 passes the username and token (as a password) to network device 125 (or server system or hosted application). At 720, the network device 125 passes the username and token to the identity broker 145. As described above, the network device 125 may pass the username and token formatted using a user authentication protocol such as RADIUS or LDAP message. At 725, the identity broker invokes a token validation process on the IdP server 150, passing the token and recipient name as parameters. At 730, the IdP server 150 returns the username and any attributes to the identity broker 145. At 735, the identity broker 145 sends a message to the network device using a message formatted using the user authentication protocol such as RADIUS or LDAP, i.e., using the same protocol used by the network device 125 at 720. At 740, the network device grants access to the client 130. Once authenticated, the client may access additional network devices, systems, or hosted applications by repeating elements 710-740 of timing sequence diagram 700.

As described, embodiments of the invention provide techniques for an identity broker to authenticate users to network devices (or hosted applications) that use certain legacy protocols for user authentication. For example, the identity broker may be configured to respond to a user-authentication request from a network device formatted as a RADIUS or LDAP message. The identity broker may operate in conjunction with an identity provider to authenticate a user requesting access to a computing resource (e.g., the network device or hosted application).

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for authenticating a user requesting access to a computing resource, the method comprising:
   receiving, from the computing resource, a request to authenticate the user, wherein the request includes a token and a username, and wherein the request is formatted according to a user authentication protocol understood by the computing resource;
   invoking, on an identity provider server including a transient token store, a token validation process, wherein the token is passed as a parameter to the token validation process;
   invalidating the token in the transient token store if the token is valid;
   receiving, from the identity provider server, an authentication message; and
   generating, in response to the request received from the computing resource, a validation response formatted according to the user authentication protocol, wherein the response indicates whether the authentication message indicates the token was successfully validated by the identity provider server.

2. The method of claim 1, wherein the authentication message further comprises an indication of one or more attributes associated with the user requesting access to the computing resources stored on the identity provider server.

3. The method of claim 2, wherein the user authentication protocol comprises the Remote Authentication Dial In User Service (RADIUS) protocol.

4. The method of claim 2, wherein the user authentication protocol comprises the lightweight directory access protocol (LDAP).

5. The method of claim 4, further comprising:
   receiving an LDAP message requesting a list of groups to which the user is a member; and
   generating a response formatted according to the LDAP protocol which includes at least the one or more attributes, wherein the one or more attributes comprise the groups which the user is a member.

6. The method of claim 1, wherein a recipient ID identifying the computing resource is also passed as a parameter to the token validation process.

7. The method of claim 1, wherein the token comprises a random alpha-numeric string generated by the identity provider server.

8. The method of claim 1, wherein the identity provider server is configured to authenticate the user and to provide the token to a client, and wherein the client is configured to pass the token to the computing resource.

9. The method of claim 8, wherein the identity provider server is further configured to generate a single sign-on session associated with the user once the user is authenticated by the identity provider.

10. The method of claim 1, wherein the computing resource is one of a network device, system, and hosted application.

11. A computer-readable storage medium containing a program which, when executed by a processor, performs an operation for authenticating a user requesting access to a computing resource, the operation comprising:
    receiving, from the computing resource, a request to authenticate the user, wherein the request includes a token and a username, and wherein the request is formatted according to a user authentication protocol understood by the computing resource;
    invoking, on an identity provider server including a transient token store, a token validation process, wherein the token is passed as a parameter to the token validation process;
    invalidating the token in the transient token store if the token is valid;
    receiving, from the identity provider server, an authentication message; and
    generating, in response to the request received from the computing resource, a validation response formatted according to the user authentication protocol, wherein the response indicates whether the authentication message indicates the token was successfully validated by the identity provider server.

12. The computer-readable storage medium of claim 11, wherein the authentication message further comprises an indication of one or more attributes associated with the user requesting access to the computing resources stored on the identity provider server.

13. The computer-readable storage medium of claim 12, wherein the user authentication protocol comprises the Remote Authentication Dial In User Service (RADIUS) protocol.

14. The computer-readable storage medium of claim 12, wherein the user authentication protocol comprises the lightweight directory access protocol (LDAP).

15. The computer-readable storage medium of claim 14, wherein the operation further comprises:
    receiving an LDAP message requesting a list of groups to which the user is a member; and
    generating a response formatted according to the LDAP protocol which includes at least the one or more attributes, wherein the one or more attributes comprise the groups which the user is a member.

16. The computer-readable storage medium of claim 11, wherein a recipient ID identifying the computing resource is also passed as a parameter to the token validation process.

17. The computer-readable storage medium of claim 11, wherein the token comprises a random alpha-numeric string generated by the identity provider server.

18. The computer-readable storage medium of claim 11, wherein the identity provider server is configured to authenticate the user and to provide the token to a client, and wherein the client is configured to pass the token to the computing resource.

19. The computer-readable storage medium of claim 18, wherein the identity provider server is further configured to generate a single sign-on session associated with the user once the user is authenticated by the identity provider.

20. A system, comprising:
    one or more computer processors; and
    a memory containing a program, which when executed by the one or more computer processors is configured to perform an operation for authenticating a user requesting access to a computing resource, the operation comprising:
    receiving, from the computing resource, a request to authenticate the user, wherein the request includes a token and a username, and wherein the request is formatted according to a user authentication protocol understood by the computing resource,
    invoking, on an identity provider server including a transient token store, a token validation process, wherein the token is passed as a parameter to the token validation process,
    invalidating the token in the transient token store if the token is valid,
    receiving, from the identity provider server, an authentication message, and
    generating, in response to the request received from the computing resource, a validation response formatted according to the user authentication protocol, wherein the response indicates whether the authentication message indicates the token was successfully validated by the identity provider server.

21. The system of claim 20, wherein the authentication message further comprises an indication of one or more attributes associated with the user requesting access to the computing resources stored on the identity provider server.

22. The system of claim 21, wherein the user authentication protocol comprises one of the Remote Authentication Dial In User Service (RADIUS) protocol and the lightweight directory access protocol (LDAP).

23. The system of claim 20, wherein a recipient ID identifying the computing resource is also passed as a parameter to the token validation process and wherein the token comprises a random alpha-numeric string generated by the identity provider server.

24. The system of claim 20, wherein the identity provider server is configured to authenticate the user and to provide the token to a client, and wherein the client is configured to pass the token to the computing resource.

25. The system of claim 20, wherein the identity provider server is further configured to generate a single sign-on session associated with the user once the user is authenticated by the identity provider.

* * * * *